(12) United States Patent
Lin

(10) Patent No.: US 7,475,994 B2
(45) Date of Patent: Jan. 13, 2009

(54) SYSTEM, METHOD, AND APPARATUS FOR DETECTING A PROJECTED POINT ON COMPUTER CONTROLLED DISPLAYED IMAGES

(75) Inventor: I-Jong Lin, Woodside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1448 days.

(21) Appl. No.: 10/180,743

(22) Filed: Jun. 26, 2002

(65) Prior Publication Data
US 2004/0001043 A1    Jan. 1, 2004

(51) Int. Cl.
*G03B 21/14* (2006.01)
(52) U.S. Cl. .............................. 353/42; 353/121; 353/85; 345/157
(58) Field of Classification Search .................... 353/42, 353/69, 28, 121, 122, 30, 71; 348/14.03, 348/14.05; 398/106, 107; 367/197–199; 345/157, 158, 163, 180, 182, 183
See application file for complete search history.

(56) References Cited

U.S. PATENT DOCUMENTS

| 5,138,304 | A | | 8/1992 | Bronson |
|---|---|---|---|---|
| 5,191,411 | A | * | 3/1993 | Muckerheide ................ 348/61 |
| 5,504,501 | A | * | 4/1996 | Hauck et al. ................. 345/158 |
| 5,550,560 | A | * | 8/1996 | Kanada et al. ............... 345/156 |
| 5,926,168 | A | * | 7/1999 | Fan .............................. 345/158 |
| 6,454,419 | B2 | * | 9/2002 | Kitazawa ..................... 353/122 |
| 6,698,897 | B2 | * | 3/2004 | Hamana et al. ............... 353/42 |
| 6,803,907 | B2 | * | 10/2004 | Chen ........................... 345/182 |
| 2002/0015137 | A1 | * | 2/2002 | Hasegawa .................... 353/42 |
| 2004/0085522 | A1 | * | 5/2004 | Honig et al. ................. 353/121 |

* cited by examiner

Primary Examiner—William C. Dowling

(57) ABSTRACT

A system, method, and apparatus are described in which a light point projected on a computer controlled displayed image is detected. A light point is projected at the displayed image at essentially the same time as a notification signal is transmitted indicating that the light point is being projected. At least one of image capture and image display parameters are adjusted to increase the detectability of the light point within a predetermined time interval after receipt of the notification signal. The image of the displayed image and the light point are captured within the predetermined time interval and the captured image data is analyzed to detect the light point dependent on the adjusted parameters.

18 Claims, 4 Drawing Sheets

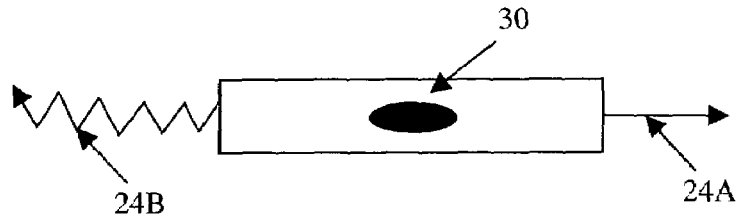

FIG. 3

| PROJECTING A LIGHT POINT ONTO A COMPUTER CONTROLLED DISPLAYED IMAGE WHILE AT ESSENTIALLY THE SAME TIME TRANSMITTING A NOTIFICATION SIGNAL INDICATING THAT THE LIGHT SIGNAL IS BEING PROJECTED 40 |
|---|

↓

| ADJUSTING AT LEAST ONE OF IMAGE DISPLAY AND IMAGE CAPTURE PARAMETERS SO AS TO INCREASE DETECTABILITY OF THE LIGHT POINT FOR A PREDETERMINED INTERVAL OF TIME AFTER RECEIPT OF THE NOTIFICATION SIGNAL 41 |
|---|

↓

| CAPTURING IMAGE DATA WITHIN THE PREDETERMINED TIME INTERVAL INCLUDING THE DISPLAYED IMAGE AND THE PROJECTED LIGHT POINT 42 |
|---|

↓

| ANALYZING THE CAPTURED IMAGE DATA DEPENDENT ON THE ADJUSTED PARAMETERS TO DETECT THE LIGHT POINT WITHIN THE DISPLAYED IMAGE 43 |
|---|

FIG. 4

SYSTEM, METHOD, AND APPARATUS FOR DETECTING A PROJECTED POINT ON COMPUTER CONTROLLED DISPLAYED IMAGES

FIELD OF THE INVENTION

The present invention relates to a system and method of interacting with a computer controlled display system with a projected light signal, and in particular, this disclosure provides a system and method of detecting the projected light signal on the computer controlled display which can allow a user to interact with the display system with the projected light signal.

BACKGROUND OF THE INVENTION

Displayed images (e.g., slides) projected onto a display screen or display area are often used during an oral presentation. The displayed images serve to enhance or supplement the oral portion of the presentation. Often the image data for driving a display device for displaying the images is provided by a computer system. Commonly, specific software applications are run by the computer system (e.g., slide generation software application) to generate the image data to be displayed by the display device.

FIG. 1 shows an example of a prior art computer controlled display system including a computer system 10 for providing image data 10A for driving a display device 11 to project an image (designated by dashed lines 11A and 11B) on a display area 12.

In this type of system, a presenter commonly uses a pointing device such as a light or laser pointer 15 to project a light or laser signal toward the displayed image thereby projecting a single light point onto the displayed images. Typically, the purpose of the projected point is to bring the audience's attention to a particular location on the displayed image. In addition to the laser pointer 15, the presenter often uses an input device 14 such as a mouse to control the computer system generating the image data 10A and more specifically, to control the manner in which the image data is displayed. Commonly the input device is a remote mouse that transmits control signals via infrared optical signals to change from one displayed slide to the next.

In one known technique, the display system further includes an image capture device 13 that captures the displayed image (designated by dashed lines 13A and 13B) and any object projected on or positioned in front of the displayed image. The captured data 13C is provided to an image analyzer 16 that determines the location of the objects and provides this location information 16A to the computer system 10. Providing the location information of objects, such as pointing sticks, fingers, or light pointers, to the computer system can provide a user the ability to interact with the displayed image using these pointing devices.

However, detection of an object used for pointing (e.g., a wooden stick or a finger) positioned in front of a displayed image using the system shown in FIG. 1 is more reliable than detection of a light point projected on the displayed image. Specifically, in the case of detecting an object, a technique is known using the system shown in FIG. 1 that reliably detects the pixel locations of the object in the captured image data by separating foreground image data from the displayed image data within the captured image data. However, it is often difficult to determine whether the detected pixels using this technique correspond to a laser point or if the detected pixels are produced by a noisy system or environment. The main reason for this is because a laser point tends to cover only a few pixels locations within the captured image data in the same way as noise manifests itself. This problem of detecting the laser point can be further exacerbated by poor lighting conditions, inferior image capture or display devices, or a highly dynamic image.

In another known technique, the chromatic nature of the laser pointer (i.e., typically a single highly saturated color) is used to detect a laser point within captured image data by detecting pixel values have an anticipated specific color and intensity that is unlike the displayed image data 10A. However, manufacturing variations can affect the laser pointer intensity and as a result, detection relying on an anticipated laser intensity may be problematic.

Hence, what would be desirable is a system and method for reliably detecting a light point on a computer controlled displayed image.

SUMMARY OF THE INVENTION

A system for reliably detecting a projected light point on a computer controlled display is described. A display system includes a computer system for providing image data and controlling the display of the image data by a display device. The display system further includes a device for projecting a light point at the displayed image while simultaneously transmitting a notification signal indicating the light point is being projected. A controller adjusts at least one of image capture or image display parameters to increase the detectability of the light point for a predetermined time interval after receipt of the notification signal. An image capture device captures image data including the displayed image and the projected light point during the predetermined time interval. An analyzer detects the light point within the captured image data dependent on the parameter adjustments. In one embodiment, image display parameters are adjusted by reducing the image intensity of the displayed image data to at least a value that is less than a maximum value and the light point is detected by identifying values greater than the maximum value within the captured image data.

An apparatus is described where upon activation, the apparatus projects a visible light signal while simultaneously emitting a notification signal indicating the light signal is being transmitted.

A method for use in a system for detecting a light point projected on computer controlled displayed images is described. The method comprises projecting a light point on the displayed image while at essentially the same time transmitting a notification signal indicating the light point is being projected; adjusting at least one of image capture or image display parameters to increase the detectability of the light point within a predetermined time interval after receipt of the notification signal; within the predetermined time interval, capturing image data including the displayed image and the projected light point; and analyzing the captured image data to detect the light point within the captured image data dependent on the adjusted parameters.

BRIEF DESCRIPTION OF THE DRAWINGS

FIG. 3 shows an embodiment of an apparatus for projecting a light signal on a computer controlled display area and transmitting a notification signal indicating the light signal is being projected at essentially the same time;

FIG. 4 shows a first embodiment of a method for detecting a projected light point on computer controlled display images in accordance with the present invention;

DETAILED DESCRIPTION OF THE INVENTION

A system and method of the present invention provides a technique of detecting a laser point projected on computer controlled displayed images is described. An apparatus for facilitating the system and method is also described. It should be noted that for purposes of the subject disclosure a computer controlled display system includes at least a computer, a processing system or device, or a computing system or device for generating and controlling the display of image data; a display area for displaying the images; and a means for displaying the image data (e.g., projector) in the display area which is controlled by the computer, processing system or device, or computing system or device.

Figure 1:
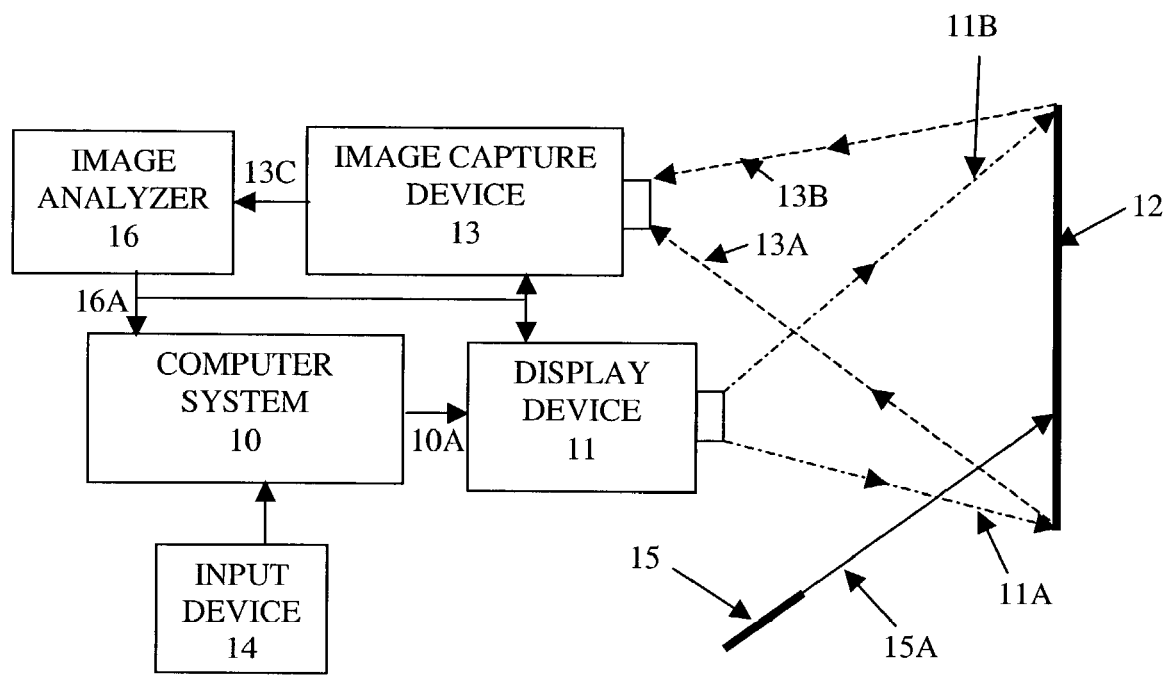
FIG. 1 shows a prior art system for interacting with a computer controlled image display system using a separate light projecting device and an input device.
Figure 2:
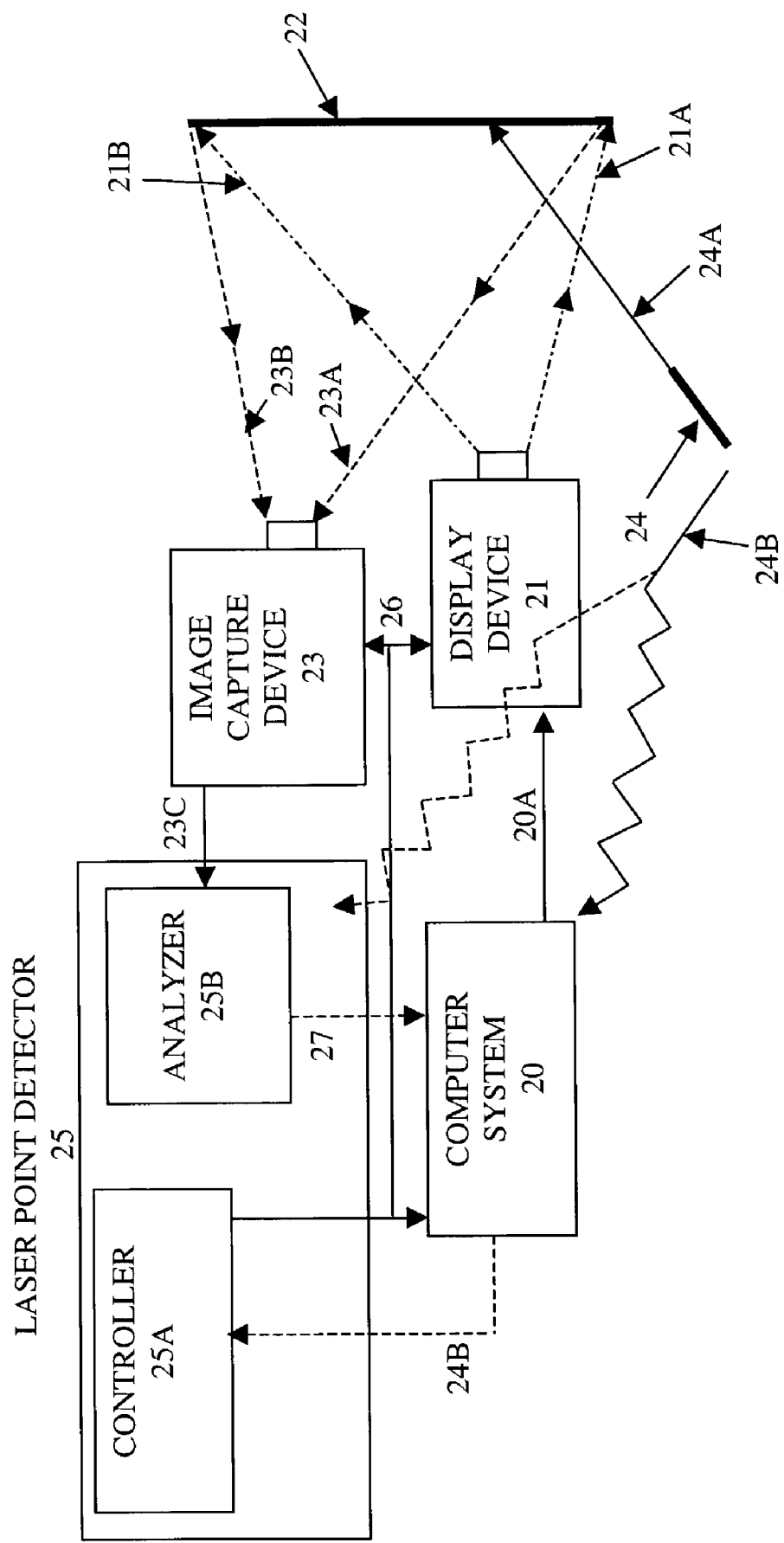
FIG. 2 shows an embodiment of a system for detecting a light point projected on computer controlled displayed images in accordance with the present invention.

FIG. 2 shows an embodiment of the system of the present invention including a computer system 20, a display device 21, and display area 22, an image capture device 23, a projection device 24, and a laser point detector 25 comprising a controller 25A and an analyzer 25B. The computer system 20 provides image data 20A. In one embodiment, the computer system includes at least a storage area (not shown) for storing image data 20A. In another embodiment, the computer system includes a software application (not shown), such as slide presentation generation software, for generating and providing image data 20A. The image data 20A drives the display device 21 to display an image (designated by dashed lines 21A and 21B) onto display area 22. The display area may be a display screen, monitor, or may simply be a wall.

Light projection device 24 projects a light signal 24A, which in turn, causes a light point to be projected onto the displayed image (21A-21B). At essentially the same time, device 24 transmits a notification signal 24B that indicates the light signal is being projected. It should be noted that in accordance with the system shown in FIG. 2, the notification signal can be transmitted by one of a wired (solid line) or wireless (dashed line) transmission. In one embodiment, the notification signal can be transmitted to the computer system 20 that, in turn, transmits it to controller 25A. Alternatively, the notification signal can be transmitted directly to laser point detector 25 for coupling to controller 25A. The notification signal can be transmitted via an infrared signal. In one embodiment, activation of device 24 to project the light signal and transmit the notification signal is achieved by a single control option (e.g., depression of a single button) on device 24. The device 24 can be a pointing device used during a slide presentation by a presenter to identify locations of importance on the display area such as a laser pointer. Alternatively, the pointing device can be a wired or wireless computer mouse including a laser projector.

The notification signal 24B is received by controller 25A directly or from the computer system 20. In response, controller 25A adjusts either image capture or image display parameters so as to increase the detectability of the light point within a predetermined time interval occurring after the receipt of the notification signal 24B. Specifically, controller 25A can transmit control signals on bus 26 to either the computer system 20, display device 21 or the image capture device 23 to adjust image display and/or image capture parameters in a way so as to increase the detectability of the light point within the displayed image captured by image capture device 23.

The image capture device 23 captures an image (designated by dashed lines 23A and 23B) within the predetermined time interval. The captured image data includes the displayed image (21A-21B) and the light point projected by light signal 24A onto the displayed image. Since image capture and/or image display parameters are adjusted during the predetermined time period, the reliability of detecting the light point within the captured image data 23C captured within the predetermined time period is increased. It should be noted that the image capture device can be either an analog or digital image capture device and can be either a still image capture device or a video device. The captured image data 23C is coupled to analyzer 25B that detects the laser point dependent on the adjusted parameters.

It should be further noted that the laser point detector 25 can be implemented by one of hardware, software, or firmware. It should further be noted that the laser point detector 25 can be embodied within the computer system 20 or external to the computer system 20 (as shown in FIG. 2).

FIG. 3 shows one embodiment of an apparatus for projecting a light signal 24A while transmitting, at essentially the same time, a notification signal 24B indicating that the light signal is being projected. As shown, the apparatus includes an activation option 30 that when activated causes the emission of signals 24A and 24B. The activation option can comprise a button that when depressed, activates the apparatus or any alternative activation option. The apparatus can be embodied as a laser pointer having the additional feature of emitting a notification signal when the laser signal is being projected. Alternatively, the apparatus can be embodied as a computer mouse having the additional feature of emitting a laser signal at the same time as activating the mouse. In this embodiment, the computer system is adapted to receive the notification signal from the apparatus since there is a pre-existing communication path between the computer mouse and the computer system.

FIG. 4 shows a first embodiment of the method of detecting a light point on computer controlled displayed images. Initially, a light point is projected on the displayed images at essentially the same time that a notification signal is transmitted indicating that the light signal is being projected (block 40). Next, at least one of image display or image capture parameters are adjusted to increase the detectability of the light signal for a predetermined time interval (block 41) after receipt of the notification signal. For instance, image capture parameters may be adjusted so as to cause a sensitivity to particular colors and intensities of the light point and/or to cause an insensitivity to all colors and intensities that are not the same as or similar to the light point. Alternatively, the display parameters can be adjusted such that the light point is more detectable within the adjusted displayed image (as will be described herein below).

The displayed image and the laser point are captured within the predetermined time interval (block 42). The captured image data is then analyzed dependent on the adjusted parameters to detect the light point within the displayed image (block 43). In particular, the captured data is analyzed to identify the pixels corresponding to the laser point and determine their corresponding location within the displayed image.

In one embodiment, prior to analyzing the captured data 23A to detect the laser point, captured data 23A is initially analyzed to identify all pixel values that only correspond to the displayed image within the captured data. An exemplary technique of locating the pixel values corresponding to the displayed image within the captured data is described in U.S. application Ser. No. 09/774452 filed Jan. 30, 2001, entitled "A Method for Robust Determination of Visible Points of a Controllable Display within a Camera View", and assigned to the assignee of the subject application (incorporated herein by reference). In general, the displayed image pixel values are located by initially displaying and capturing a plurality of calibration images. The calibration images are single intensity greyscale images of a known intensity. Constructive and destructive feedback data is derived from the captured calibration images by incrementing or decrementing pixel values in the captured data dependent on their intensity values. The sub-set of pixels within the captured data having an intensity above a given threshold after decrementing/incrementing correspond to the displayed image area within the captured image data.

Once, the sub-set of pixel corresponding to the displayed image is determined, this sub-set of pixels can be analyzed, dependent on the adjusted parameters, to locate the pixel values corresponding to the light point. For instance, if the adjusted parameters cause the light point pixels to have a particular unique characteristic or cause the non-light point pixels to have a particular unique characteristic, then the sub-set of pixels are analyzed to differentiate pixels dependent on those unique characteristics.

Figure 5:
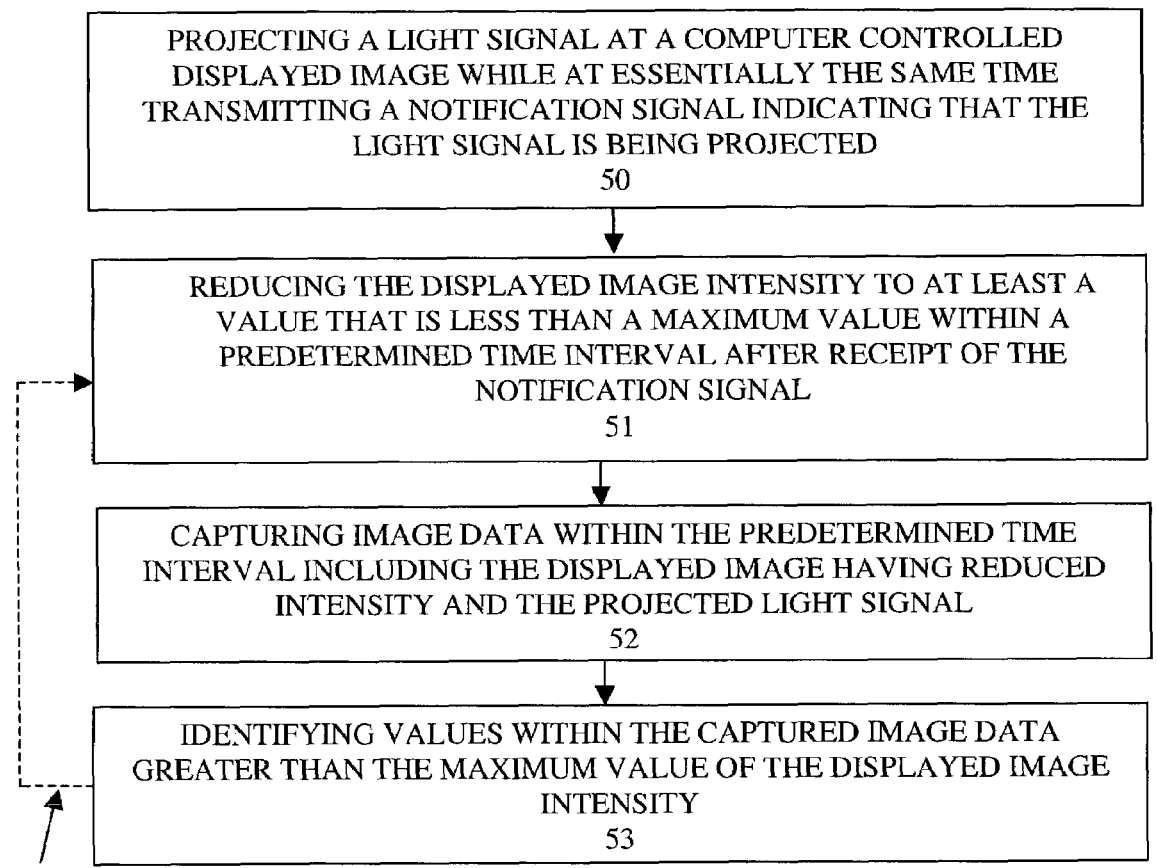
FIG. 5 shows a second embodiment of a method for detecting a projected light point on computer controlled display images in accordance with the present invention.

FIG. 5 shows a second embodiment of the method of detecting a light point on a computer controlled displayed image. Similar to the method as shown in FIG. 4, a light signal is projected at a computer controlled displayed image while at essentially the same time a notification signal is transmitted indicating that the light signal is being projected (block 50). The displayed image intensity is reduced to at least a value that is less than a maximum value within a predetermined time interval after receipt of the notification signal (block 51). For example, referring to FIG. 2, the controller 25A can send control to the computer system 20 to cause image data 20A to be displayed such that any pixel value does not exceed the maximum value. In general, it should be understood that the intensity of pixel values has a dynamic range as defined by [0, $c_0$]. For instance, an eight bit binary pixel value has a dynamic intensity range of 0-255. Hence, in one embodiment, the dynamic intensity range of the displayed image data is reduced by reducing pixel values of image data 20A to a value that is less than or equal to the maximum value. In one embodiment, the maximum value is half of the upper value ($c_0$) of the dynamic range of the displayed image (e.g., half of 255). In one embodiment, if pixel values do not exceed the maximum value, they are not reduced. Alternatively, all pixel values are reduced by the same multiplicative factor such that the maximum pixel intensity is less than the maximum value.

After pixel values have been reduced, image data including the displayed image having reduced intensity and the projected light signal is captured within the predetermined time interval (block 52). The light point is detected by identifying values within the captured image data that are greater than the maximum value of the displayed image (block 53).

In one embodiment, pixel values can be reiteratively reduced, captured, and analyzed (blocks 51, 52, and 53) to detect the light point as indicated by path 54 (FIG. 5). In this embodiment, the pixel value intensity of the image data 20A is reduced as a function of time during the predetermined time interval until the light point is detected or until the end of the predetermined time interval. For instance, at the beginning of the predetermined time interval (time $t_0$) the upper value of the dynamic range $c_0$ of image data 20A is unchanged. At a time $t_1$ within the predetermined time interval, a first maximum value is determined according to an intensity function at time $t_1$, and all pixels in image data 20A having a value greater than the first maximum value are reduced (block 51). Image data 23A is captured including the intensity reduced displayed images and the light point (block 52). The sub-set of pixel values in the captured image data 23A corresponding to the displayed image (as determined above) is analyzed and any pixels having an intensity greater than the first maximum value are identified as light point pixel values (block 53). If there are no pixel values greater than the first maximum value, then at time $t_2$, the dynamic range of the displayed image data 20A is further reduced below a second maximum value as determined by the intensity function at time $t_2$ (block 51 is repeated). Image data is again captured (block 52) and analyzed (block 53) to identify any of the sub-set of pixel values within the captured image data 23A corresponding to the displayed imaged that are greater the second maximum value. This process is reiterated until the end of the predetermined time interval. The following is an exemplary function for reducing pixel values:

$$c_{max}(t) = \max\left(0, c_o \cdot \left(\frac{T-t}{T}\right)\right), \qquad \text{Eq. 1}$$

where $c_{max}(t)$ is the maximum value as a function of time t, $c_0$ is the original upper intensity value of the dynamic range of the display (e.g., 255), and T is the length of the predetermined time interval. It should be noted that as t approaches T, $c_{max}(t)$ approaches zero. It should be further noted that any function that approaches zero as t approaches T can also be employed to set the maximum values.

Once the light point is detected within the captured image data 23C, its coordinate location within the captured image data is also known. This coordinate location can be translated into a coordinate location within the displayed image data 20A. In an exemplary technique for determining the coordinate location of the light point within the image data 20A given its coordinate location within the captured data, a mapping function is derived between the coordinate system of the set of pixels values within the captured image data 23A corresponding to the displayed image and the coordinate system of the displayed image data 20A. In one embodiment, this mapping function is derived as described in U.S. application Ser. No. 09/775,032 filed Jan. 31, 2001, entitled "A System and Method For Robust Foreground And Background Image Data Separation For Location Of Objects In Front Of A Controllable Display Within A Camera View", and assigned to the assignee of the subject application (incorporated herein by reference).

By determining the corresponding location of the light point within the image data 20A, the light point user can control the display system dependent on the placement of the light point within the displayed image. For instance, by placing the light point in a particular position on the displayed image, the user can provide control, for instance, to the operating system or applications running on the computer system. In addition, the information can be used to cause the application software generating the slide images to switch to a new slide. In general the information can be converted to correspond to any input signal that the computer system might expect to receive from a conventional input device such as a keyboard or a mouse. In another embodiment, the information can be provided to the display device to cause it to adjust its settings. In still another embodiment, the information can be provided to the image capture device for controlling the parameters (e.g., resolution) of capturing image data.

Hence, a system, method, and apparatus are described for detecting a light point projected on computer controlled displayed images that allows a user to easily interact with the display system using a single device.

In the preceding description, numerous specific details are set forth in order to provide a thorough understanding of the present invention. It will be apparent, however, to one skilled in the art that these specific details need not be employed to practice the present invention. In addition, it is to be understood that the particular embodiments shown and described by way of illustration is in no way intended to be considered limiting. Reference to the details of these embodiments is not intended to limit the scope of the claims.

I claim:

1. A system including a computer system for controlling and generating image data for displaying an image, the system comprising:
    a device for projecting a light point at the displayed image while at essentially the same time transmitting a notification signal indicating the light point is being projected;
    a controller for adjusting at least one of image capture and image display parameters so as to increase detectability of the projected light point upon the displayed image for a predetermined interval of time after receipt of the notification signal;
    a device for capturing image data including the displayed image and the projected point upon the displayed image within the predetermined time interval;
    a analyzer for detecting the projected point within the captured image data dependent on the adjusted parameters.

2. The system as described in claim 1 wherein the controller is an image display controller for reducing displayed image intensity for the predetermined time interval to at least an intensity value that is less than or equal to a maximum value.

3. The system as described in claim 1 wherein the image analyzer detects the projected point within the captured image data by identifying intensity values greater than the maximum value.

4. The system as described in claim 1 wherein the image display controller reduces displayed image intensity as a function of time for the predetermined time interval until the projected point is detected or until the time interval has ended.

5. The system as described in claim 1 wherein the device for projecting a projected point is a laser pointer.

6. The system as described in claim 1 wherein the projected point is projected and the notification signal is transmitted upon activation of a single control option on the light projection device.

7. The system as described in claim 1 wherein the notification signal is transmitted by one of a wireless and wired connection.

8. The system as described in claim 1 wherein the notification signal is transmitted via an infrared signal.

9. The system as described in claim 1 wherein the image analyzer is implemented by one of hardware, software, and firmware.

10. A method for use in a display system including a computer system for generating image data for displaying an image, the method comprising:
    projecting a light point upon the displayed image while at essentially the same time transmitting a notification signal indicating the light point is being projected;
    adjusting at least one of image display and image capture parameters so as to increase detectability of the projected point upon the displayed image for a predetermined interval of time after receipt of the notification signal;
    capturing image data within the predetermined time interval including the displayed image and the projected light point upon the displayed image;
    analyzing the capture image data to detect the projected point within the displayed image dependent on the adjusted parameters.

11. The method as described in claim 10 wherein adjusting at least one of image display and image capture comprises reducing the displayed image intensity to at least an intensity value that is less than a maximum value.

12. The method as described in claim 10 wherein adjusting at least one of image display and image capture comprises reducing the dynamic intensity range of the displayed image data.

13. The method as described in claim 10 wherein analyzing image data further comprises identifying intensity values greater than the maximum value in the captured image data to detect the projected point within the displayed image.

14. The method as described in claim 10 wherein adjusting at least one of image display and image capture comprises increasing resolution when capturing image data.

15. The method as described in claim 10 wherein adjusting at least one of image display and image capture comprises increasing sensitivity to colors other than a particular color and intensity associated with the projected point when capturing image data.

16. The method as described in claim 10 where adjusting at least one of image display and image capture comprises decreasing sensitivity to colors other than a particular color and intensity associated with the projected point when capturing image data.

17. The method as described in claim 10 where adjusting at least one of image display and image capture comprises decreasing sensitivity to colors other than a particular color and intensity associated with the projected point when capturing image data.

18. The method as described in claim 10 further comprising:
    adjusting at least one of image display and image capture parameters by reiteratively reducing as a function of time the displayed image intensity during the predetermined time interval; and
    capturing image data within the predetermined time interval by capturing the displayed image and the projected point at least each time the displayed image intensity is reduced; and
    identifying intensity values greater then a maximum value in the captured image data to detect the projected point within the displayed image.

* * * * *

UNITED STATES PATENT AND TRADEMARK OFFICE
CERTIFICATE OF CORRECTION

| | | |
|---|---|---|
| PATENT NO. | : 7,475,994 B2 | Page 1 of 1 |
| APPLICATION NO. | : 10/180743 | |
| DATED | : January 13, 2009 | |
| INVENTOR(S) | : I-Jong Lin | |

It is certified that error appears in the above-identified patent and that said Letters Patent is hereby corrected as shown below:

In column 8, line 58, in Claim 18, delete "then" and insert -- than --, therefor.

Signed and Sealed this

Twelfth Day of May, 2009

JOHN DOLL
*Acting Director of the United States Patent and Trademark Office*